United States Patent
Ellicott

(10) Patent No.: US 9,764,401 B2
(45) Date of Patent: Sep. 19, 2017

(54) ZERO LEAD GENERATIVE CUTTING TOOL

(71) Applicant: Caterpillar Inc., Peoria, IL (US)

(72) Inventor: Gabriel J. Ellicott, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 218 days.

(21) Appl. No.: 14/705,211

(22) Filed: May 6, 2015

(65) Prior Publication Data

US 2016/0325366 A1  Nov. 10, 2016

(51) Int. Cl.
*B23F 5/20* (2006.01)
*B23F 1/06* (2006.01)

(52) U.S. Cl.
CPC .............. *B23F 5/202* (2013.01); *B23F 1/06* (2013.01); *Y10T 409/103975* (2015.01); *Y10T 409/105883* (2015.01); *Y10T 409/106201* (2015.01)

(58) Field of Classification Search
CPC . Y10T 409/107155; Y10T 409/106519; Y10T 409/10636; Y10T 409/106201; Y10T 409/105883; Y10T 409/105088; Y10T 409/10477; Y10T 409/103975; Y10T 409/103816; Y10T 409/107791; Y10T 409/10795; Y10T 409/108586; Y10T 409/108745; Y10T 409/108904; B23F 5/20; B23F 5/202; B23F 5/205; B23F 5/22; B23F 5/26; B23F 1/06
See application file for complete search history.

(56) References Cited

U.S. PATENT DOCUMENTS

| | | | | |
|---|---|---|---|---|
| 1,516,524 A * | 11/1924 | Fellows | ................... | B23F 5/20 409/38 |
| 1,545,070 A * | 7/1925 | Sears | ................... | B23F 5/205 409/41 |
| 2,736,239 A * | 2/1956 | Higashi et al. | ......... | B23F 15/00 409/41 |
| 3,188,915 A * | 6/1965 | Fritz Hurth | ............... | B23F 5/12 409/11 |
| 3,877,150 A * | 4/1975 | Hofler | ....................... | B23F 5/08 33/501.14 |

(Continued)

FOREIGN PATENT DOCUMENTS

| | | | | |
|---|---|---|---|---|
| CN | 102689228 B | | 6/2014 | |
| EP | 1285716 A1 * | | 2/2003 | ............... B23F 5/20 |

OTHER PUBLICATIONS

Tony Jeffree, Gear cutting with a rack form multi-tooth cutter, http://www.jeffree.co.uk/pages/multi-tooth-gear-cutter.htm, pp. 1-18, Manchester, England.

*Primary Examiner* — Daniel Howell
(74) *Attorney, Agent, or Firm* — Miller, Matthias & Hull, LLP

(57) ABSTRACT

A hobbing or gear cutting machine uses a rotary tool to rotate a cutting tool around a central axis of the cutting tool. The cutting tool has zero lead cutters, that is, the cutting tool is non-helical. A head holds the rotary tool and moves the cutting tool longitudinally along the central axis of the cutting tool. A workpiece holder holds a workpiece to be machined into a gear proximate the cutting tool. The workpiece holder selectively rotates the workpiece in conjunction with the longitudinal movement of the cutting tool via the head to cut both straight and helical gears from the workpiece.

17 Claims, 9 Drawing Sheets

(56) References Cited

U.S. PATENT DOCUMENTS

| | | | | |
|---|---|---|---|---|
| 4,565,474 A | * | 1/1986 | Charles | B23F 5/20 |
| | | | | 409/38 |
| 4,720,220 A | * | 1/1988 | Bloch | B23F 21/083 |
| | | | | 407/118 |
| 4,750,848 A | * | 6/1988 | Adler | B23F 5/08 |
| | | | | 409/41 |
| 4,765,782 A | | 8/1988 | Ohkita | |
| 5,562,372 A | * | 10/1996 | Baima | B23F 15/06 |
| | | | | 409/31 |
| 2003/0219322 A1 | * | 11/2003 | Zankl | B23F 23/1218 |
| | | | | 409/38 |
| 2014/0255118 A1 | * | 9/2014 | Zeller | B23F 17/006 |
| | | | | 409/40 |

* cited by examiner

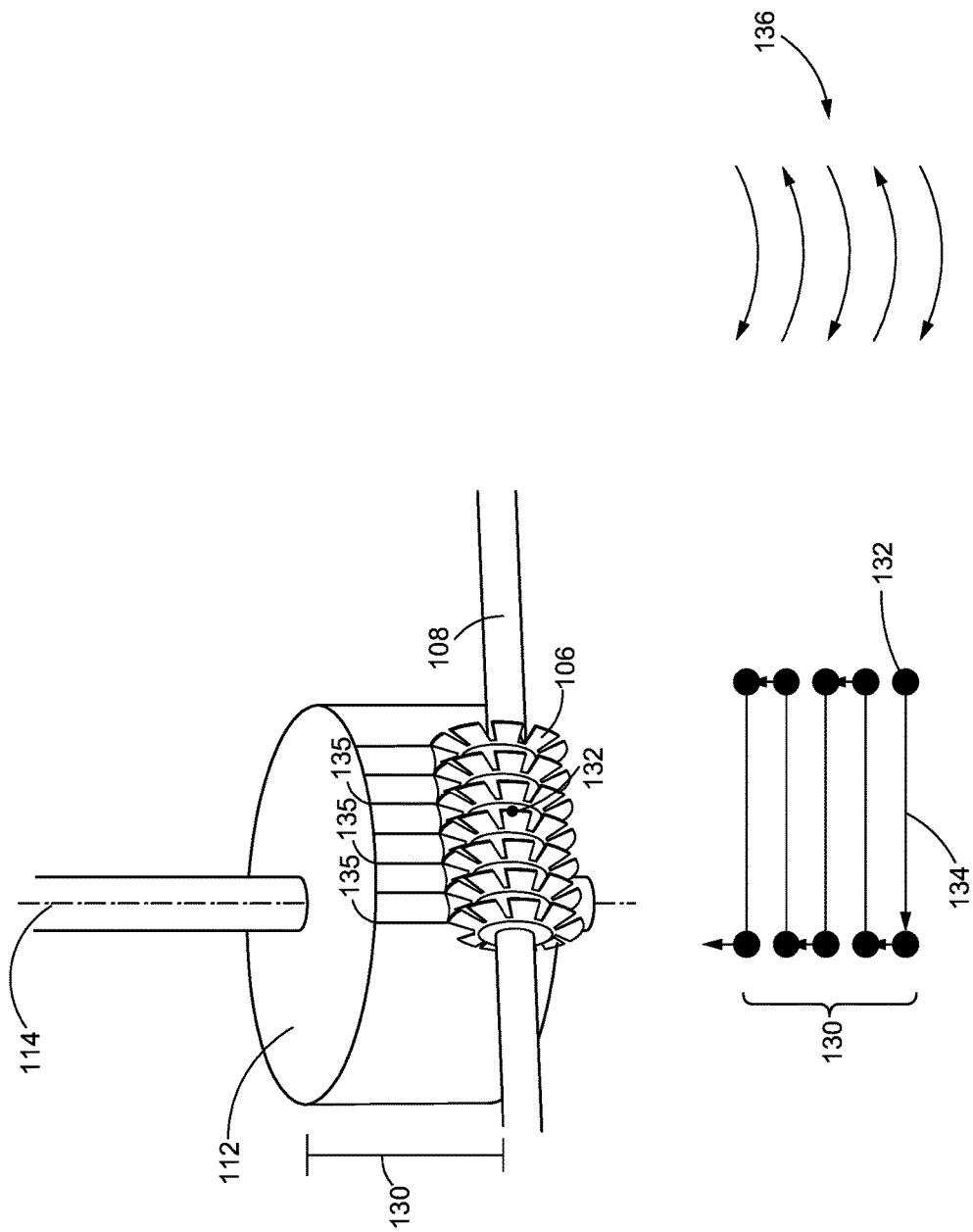

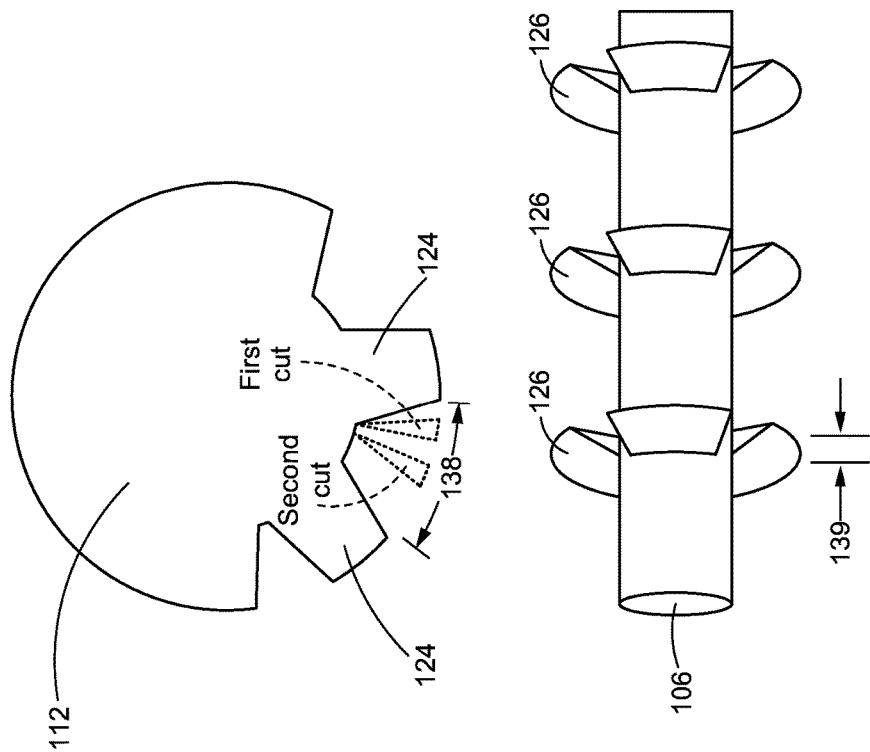

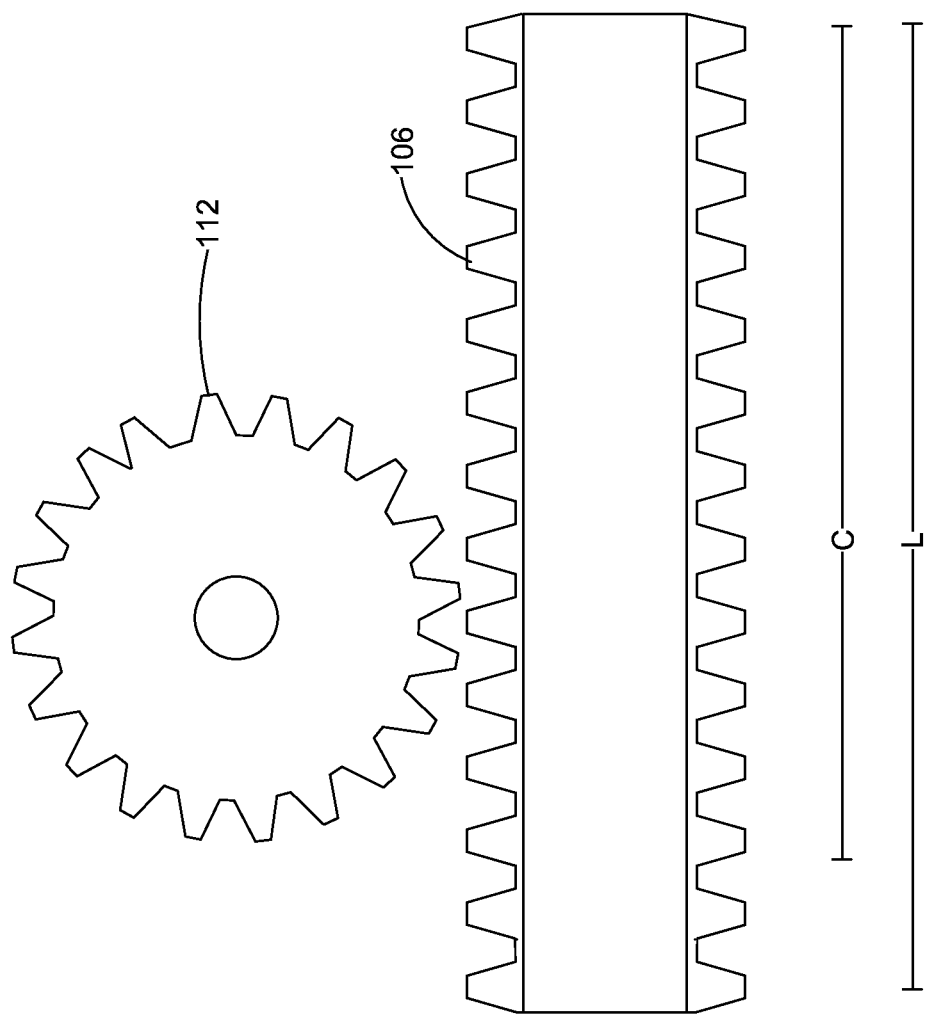

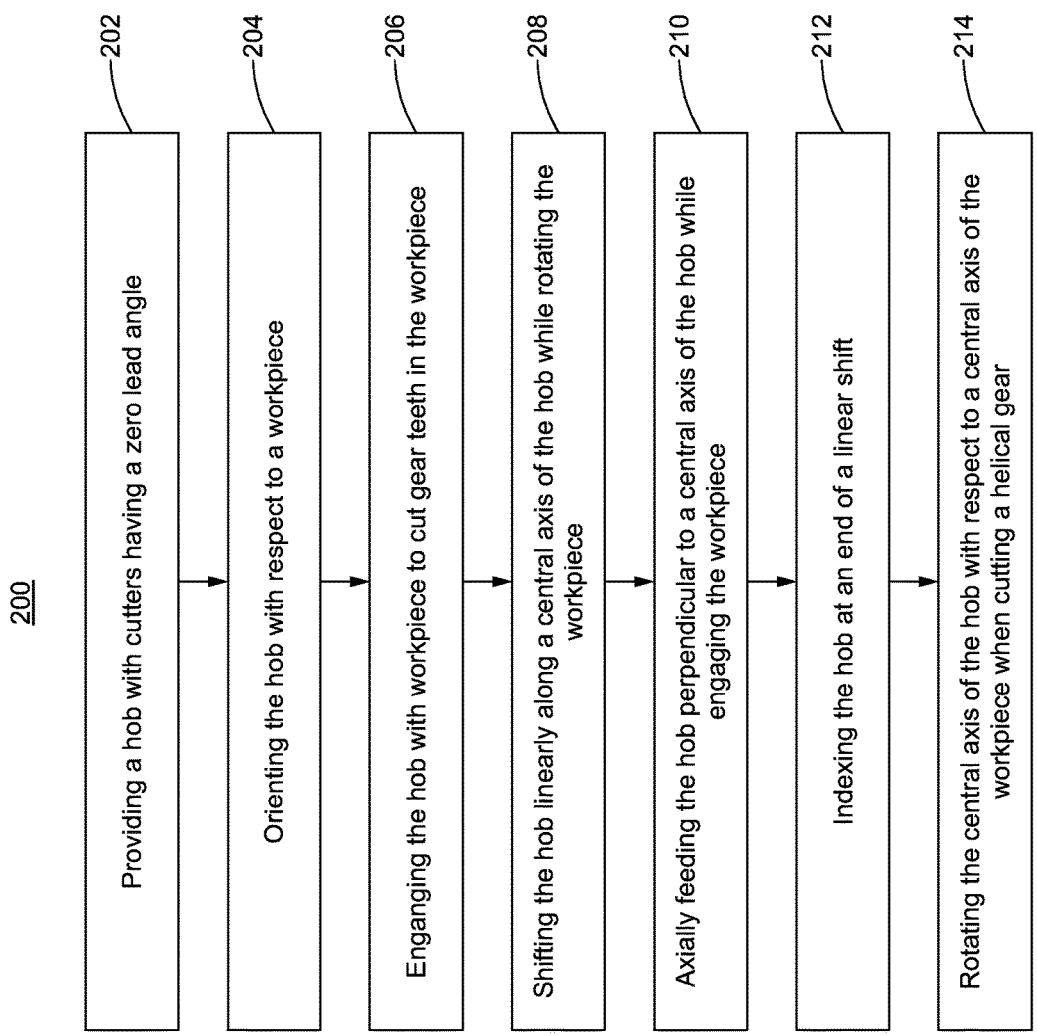

ZERO LEAD GENERATIVE CUTTING TOOL

TECHNICAL FIELD

The present disclosure is generally directed to production of gears and more particularly to a gear cutting tool with a zero lead cutting tool used to cut the gear teeth.

BACKGROUND

The manufacture of a gear can be accomplished by numerous methods. For external gears, the most common processes are either generative (hobbing and generative grinding) or form cutting (profile milling and form grinding). Each type of process has constraints and advantages. Generative processes are constrained by the ratio of gear teeth to cutter teeth (commonly called "starts" or "threads"), which limits reductions in cycle time and improvements in gear profile quality for a given tool design. The cutters are very expensive and can only be justified by a large volume of parts. However in generative processes, because the tooth shape is not the simple conjugate of the cutter shape, one cutter may be used to generate a number of parts due to cutter commonality. Form milling, where the tooth shape is the negative of the gear tooth profile form is constrained to only cutting one or two gear teeth at a time, so it is sometimes favored for gears with a low number of teeth, but can only cut one gear design, that is, there is no cutter commonality. In form cutting, the feed rate can be slowed to improve gear quality.

A gear cutting machine is described in the article "Gear cutting with a rack form multi-tooth cutter" by Tony Jeffree found at www.jeffree.co.uk (2008). The gear cutter uses a zero lead hob but simply moves the workpiece across the hob and incrementally rotates one tooth after each pass. The Jeffree article fails to disclose a general purpose gear cutter and process that combines continuous axial and radial motion of the cutter to achieve a continuous generative operation.

SUMMARY OF THE DISCLOSURE

In an aspect of the disclosure, a gear cutting tool includes a head that is programmably moveable in at least three axes, a rotary tool mounted to the head and a hob or worm wheel cutter having a zero lead angle. The cutting tool may be attached to the rotary tool so that as the rotary tool spins the cutting tool about a cutting tool central axis, the cutting tool and the rotary tool are moveable in three dimensions. A workpiece holder that holds a workpiece proximate to the cutting tool may be configured to rotate the workpiece about a workpiece axis in conjunction with at least one dimension of movement of the cutting tool.

In another aspect of the disclosure, a gear cutting tool includes a cutting tool with zero lead cutters disposed around a central axis, a rotary tool that rotates the cutting tool around the central axis and a head that moves the cutting tool longitudinally along the central axis of the cutting tool. The gear cutting tool also includes a workpiece holder adapted hold a workpiece, the workpiece holder adapted to selectively rotate the workpiece in conjunction with the longitudinal movement of the cutting tool via the head.

In yet another aspect of the disclosure, a method of cutting gears includes providing a cutting tool with cutters having a zero lead angle, orienting the cutting tool with respect to a workpiece and rotating the cutting tool about a central axis of the cutting tool. The method continues by engaging the cutting tool with the workpiece to cut gear teeth into the workpiece while shifting the cutting tool along the central axis of the cutting tool. The method includes rotating the workpiece while shifting the cutting tool perpendicular to the central axis and axially feeding the cutting tool perpendicular to the central axis while engaging the workpiece.

These and other aspects and features will be more readily understood when reading the following detailed description when taken in conjunction with the accompanying drawings.

BRIEF DESCRIPTION OF THE DRAWINGS

FIG. 3 is representation of a workpiece and cutting tool illustrating cutting tool motion during a gear cutting operation;

FIG. 4 illustrates using a cutting tool with a cutter width different than a tooth spacing in a workpiece;

FIG. 5 illustrates a cutting tool that is longer than a circumference of a workpiece;

FIG. 11 is a flowchart of an exemplary method of operating a gear cutting machine using a zero lead cutting tool.

DETAILED DESCRIPTION

Making gears is an old and refined art. The shape and spacing of gears affects strength, efficiency, and noise during operation. There are numerous ways of producing gears, from hobbing to generative grinding to form milling, each with particular characteristics.

Current manufacturing of gears via hobbing and generataive grinding involve using a helical cutting tool, similar to a screw in form, that spins to make a cut as a workpiece is synchronously rotated. This looks almost identical to a worm gear driving a regular gear, except that the cutting tool is not driving the workpiece, the movement of both the cutting tool and workpiece are mechanically synchronized. The cutting tool may be moved closer to the center of the workpiece to make a deeper cut or longer tooth. The speed of the cutting tool is fixed to the rotation speed of the workpiece so that increasing the speed the hob requires an increase in speed of the workpiece. The pitch of the helix of the cutting tool limits the gears that can be generated because of the relationship of the pitch of the cutting tool to the spacing or pitch of gear teeth on the finished work.

Figure 1:
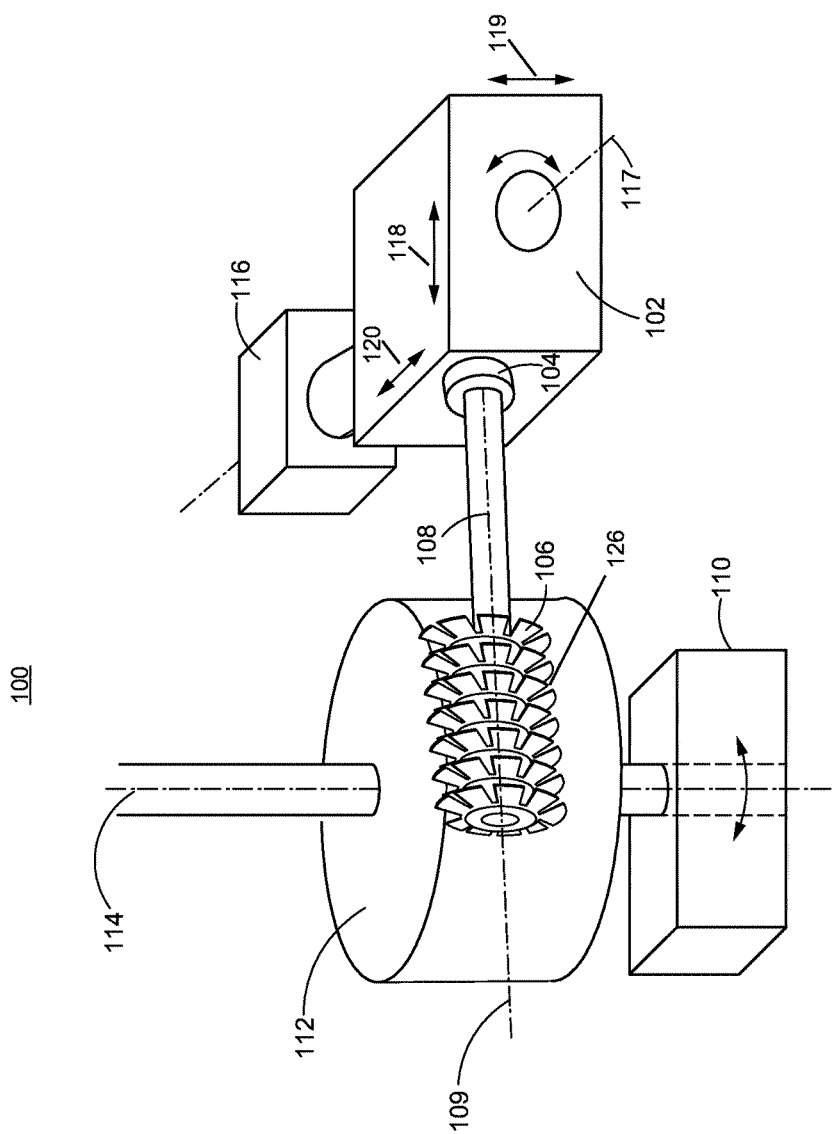
FIG. 1 is a perspective view of an exemplary gear cutting machine and a workpiece according to the present disclosure.

FIG. 1 illustrates a gear cutting machine 100 that uses a head 102 that is moveable in three axes. The head 102 is coupled to a cutting tool 106 via a shaft 108. The shaft 108 is coupled to the head 102 at a rotary tool 104 that rotates the cutting tool 106 about a cutting tool central axis 109. Unlike with helical cutting tools, a rotation speed of the cutting tool 106 may be varied based on a quality of the cut, tool life, and productivity that is desired. A high rotation speed may be used for fine cuts and a low rotation speed may be used for more coarse cuts. Additionally, the rate of motion in the x- and y-axes may be altered based on a quality of the cut, tool life, and productivity that is desired.

The gear cutting machine 100 also has a workpiece holder 110 that holds a workpiece 112 proximate to the cutting tool 106. The workpiece holder 110 is capable of rotating the workpiece 112 about a workpiece central axis 114. The gear cutting machine 100 may also optionally include a head rotator 116 that rotates the head 102 about a head rotation axis 117 as discussed more below.

The cutting tool 106 has a zero lead between cutters 126, that is, from any cutting point on one cutter, one rotation of the cutting tool 106 will lead back to the starting point. In contrast, a typical helical cutting tool has a non-zero lead that is measured in axial travel for a single rotation. In such a helical cutting tool, the lead or axial travel is directly tied to rotation speed of the workpiece so that each turn of the cutting tool creates a slot between successive teeth of the finished gear.

The head 102 is movable in three orthogonal axes. The first is the x-axis 118 or shift axis that is parallel to a shaft 108 of the cutting tool 106. The second is the y-axis 119 or axial axis that moves perpendicular to the x-axis 118. The x-axis 118 and y-axis 119 define a plane that is parallel to a workpiece central axis 114, discussed more below. The third is a z-axis 120 or depth axis that is perpendicular to the plane formed by the x-axis 118 and the y-axis 119 and therefore, perpendicular to the workpiece central axis 114.

Figure 2:
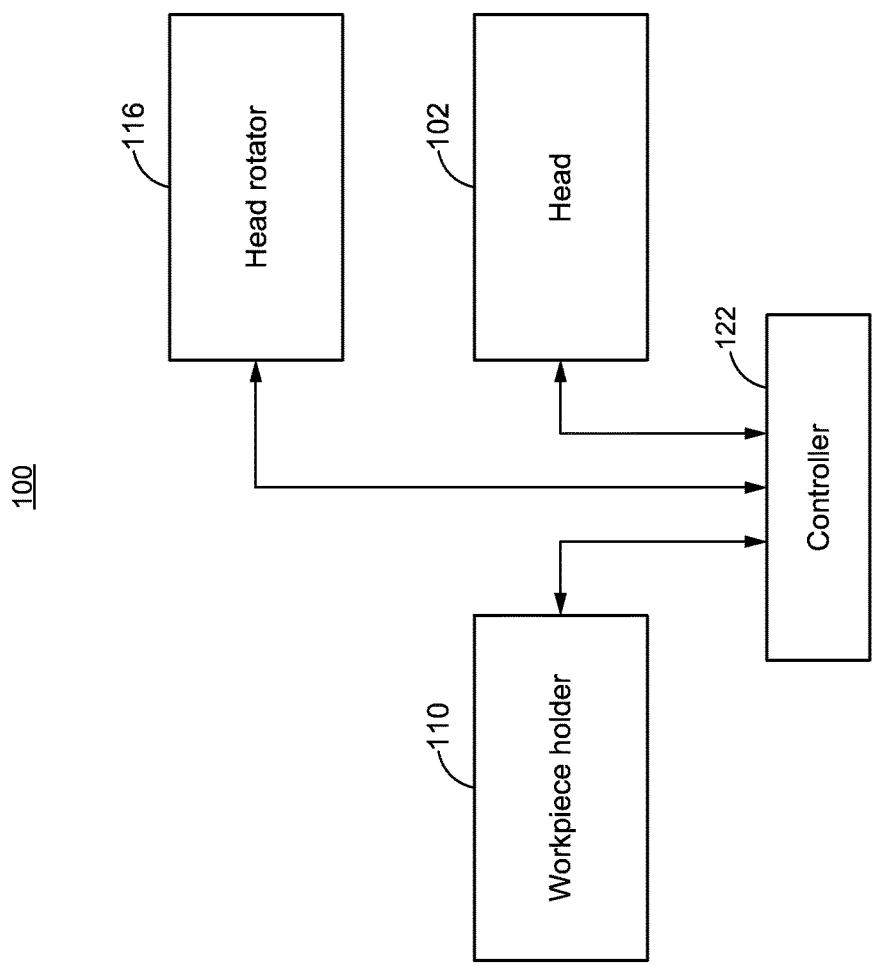
FIG. 2 is a block diagram of a control configuration of an embodiment of the gear cutting machine of FIG. 1.

FIG. 2 is a block diagram of one embodiment of the gear cutting machine 100 illustrating a control configuration using a controller 122 to control movement of the head 102, the head rotator 116, and the workpiece holder 110. Each of the head 102, the head rotator 116, and workpiece holder 110 may also include position encoding equipment (not depicted) that return position and orientation data to the controller 122 relating to the actual position of each of these controlled elements. This position and orientation data may be used by the controller 122 to ultimately determine the physical relationship between the cutting tool 106 and the workpiece 112 during the machining operation. This information may be used to calculate required motion in the head 102 and the workpiece 112 to achieve the design goal of the gear manufacturing process.

FIG. 3 illustrates a representation of a workpiece 112 with a height 130 being machined by a cutting tool 106 that is rotating on shaft 108. A reference point 132 figuratively illustrated on the cutting tool 106 is used to illustrate cutting tool motion during the machining process. The cutting tool 106 may be moved vertically and laterally (along the 'x' or shift axis 118 and 'y' or axial axis 119)) at a fixed distance (z-axis 120) from the workpiece central axis 114. The spinning motion of the cutting tool 106 will cut grooves 115 in the workpiece 112 to form the gear teeth. Diagram 134 showing cutting tool motion and diagram 136 showing workpiece motion illustrate that as the cutting tool 106 shifts right to left 134 the workpiece similarly shifts right to left or clockwise in this example. When the cutting tool 106 reaches one end it may feed axially (along the y-axis 119) while the workpiece 112 is stationary and then the cutting tool 106 may work back left to right while the workpiece 112 rotates left to right or counterclockwise in this illustration. This sequence of motions may be repeated until the cutting tool has covered the full height 130 of the workpiece 112. To accomplish this some form of position encoding must be in place for both the workpiece 112 and the cutting tool 106. In prior art gear cutting machines such position encoding would not be required because the cutting tool was held in place in the 'x' direction as the cutting tool rotated and the workpiece was mechanically driven in step with a rotation speed of the cutting tool. Also in prior art gear cutting machines, a center section of the cutting tool tends to wear out more quickly because the center of the cutting tool makes the deepest cuts in the workpiece 112.

FIG. 4 illustrates that in a generative process where a spacing 138 between gear teeth 124 is greater than a width 139 of a cutting tool cutter 126 that in addition to the successive movement discussed above, the workpiece 112 may be slightly rotated in one direction and/or the cutting tool 106 may be slightly shifted in an opposite direction and the process above repeated. For example, when a gear space 138 is 1.5 times the cutting tool cutter width 139, both the cutting tool 106 and the workpiece 112 may be moved 0.75 of the cutting tool cutter width 139 in order to cut the space between the teeth.

FIG. 5 illustrates a case where a length (L) of the cutting tool 106 is greater than a circumference (C) of the workpiece 112. An entire circumference of a workpiece/gear can be cut in one shift of the cutting tool 106.

Figure 7:
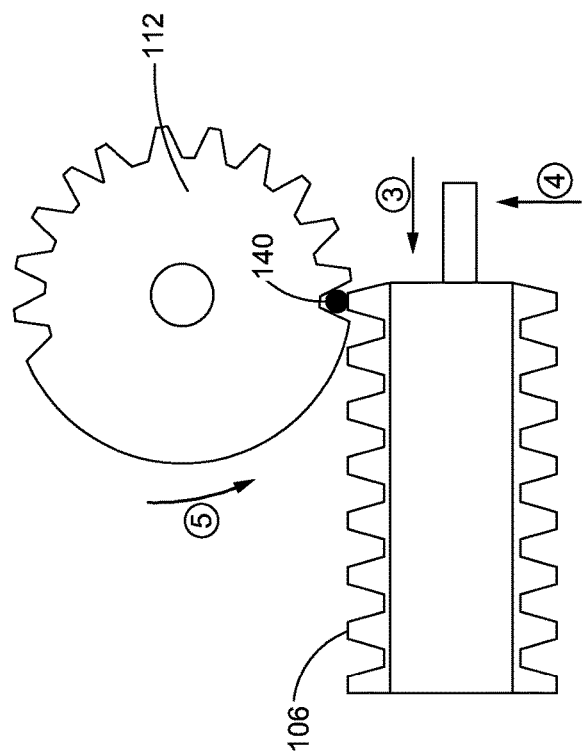
FIG. 7 is top views of a cutting tool and workpiece illustrating indexing of the cutting tool and shown in a second position.
Figure 6:
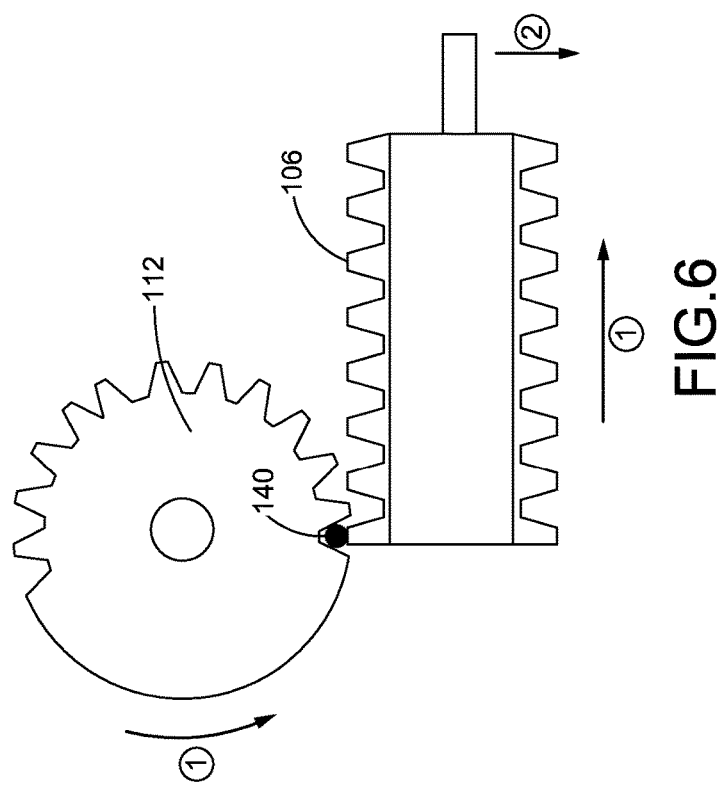
FIG. 6 is top views of a cutting tool and workpiece illustrating indexing of the cutting tool and shown in a first position.

FIGS. 6 and 7 illustrate a continuation of the machining process discussed above with respect to FIG. 3. In the example illustrated in these figures, unlike the illustration in FIG. 5, the cutting tool 106 is shorter than a circumference of the workpiece 112 and additional steps must be taken to complete the manufacturing operation. FIG. 6 may illustrate the cutting tool 106 at one end of the shift motion discussed above in FIG. 3, depicted by motion reference 1 of the cutting tool 106 and workpiece 112. A contact point 140 exists between one cutter of the cutting tool 106 and the workpiece 112. Because in this example, a width along of the cutting tool 106 is less than a circumference of the workpiece 112, the cutting tool 106 must be reset or indexed to continue the machining process on a new section of the workpiece 112. To accomplish this the cutting tool 106 is moved away from the workpiece 112 as shown by motion reference number 2.

Continuing with FIG. 7, while the workpiece 112 is kept stationary, the cutting tool 106 is moved laterally as depicted by motion reference 3 to a point where a cutter at an opposite end of the cutting tool 106 is aligned with the contact point 140. The cutting tool 106 is then moved back toward the workpiece 112 as shown by motion reference number 4. At this point, gear cutting machine 100 may continue the machining process shown in as motion reference 5 and as illustrated in FIG. 3 until the entire circumference of the workpiece 112 has been finished. As discussed above, for some generative processes an offset to accommodate a gear space that is larger than a cutting tool cutter width 139 may be included when indexing the cutting tool 106.

Figure 8:
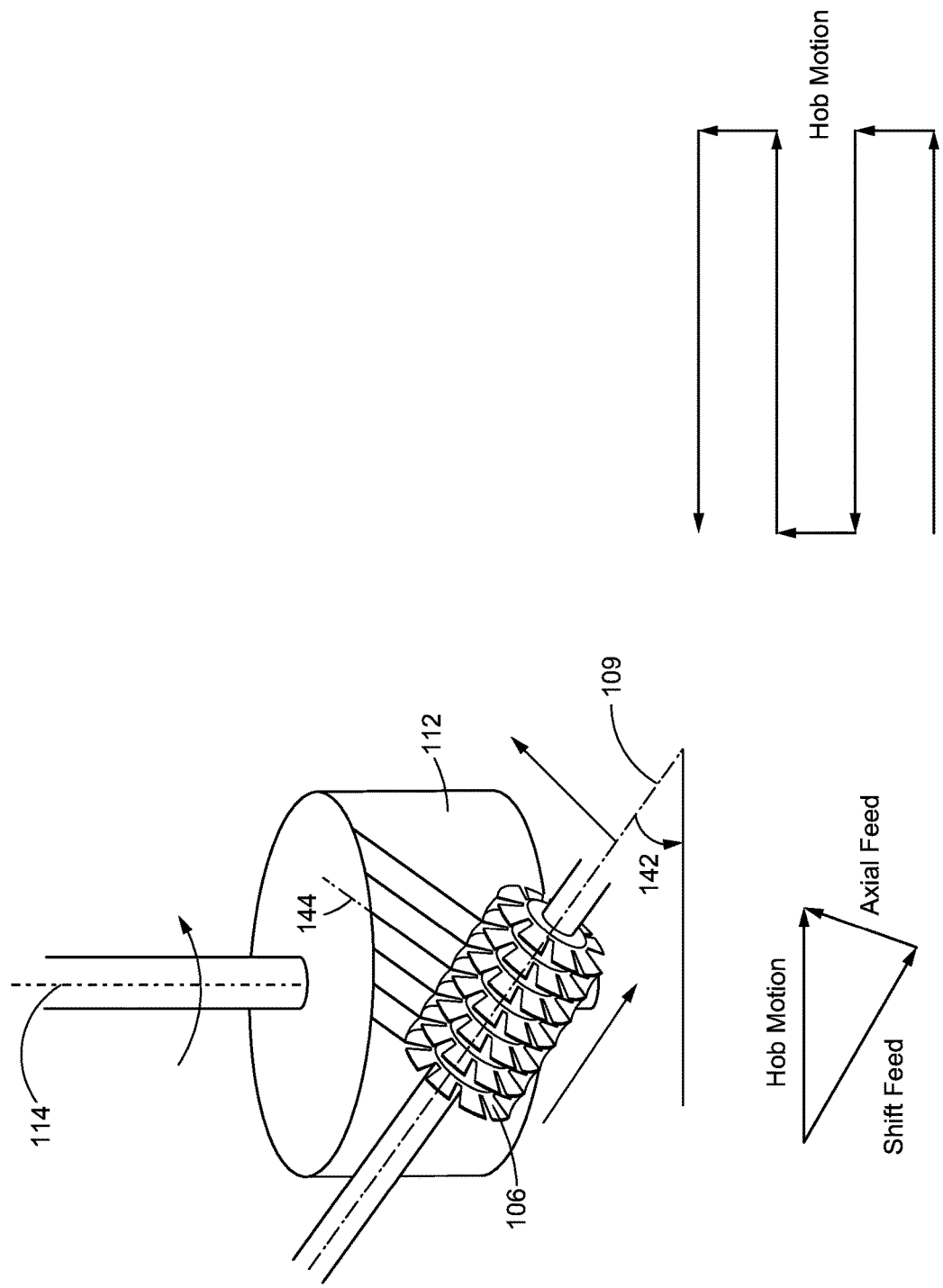
FIG. 8 is a perspective view of a workpiece and cutting tool illustrating cutting a helical gear.

FIG. 8 illustrates using the gear cutting machine 100 to manufacture a helical gear using the zero lead cutting tool 106. The head rotator 116 (see FIG. 1) is used to rotate the head 102 about the head rotation axis 117 at an angle 142 so that the cutting tool central axis 109 is no longer perpendicular to the workpiece central axis 114. An elevation of the cutting tool 106 at an angle 142 above the horizontal sets a tooth line 144 of the workpiece 112. As the cutting tool 106 spins it is shifted along its central axis 109 and axially perpendicular to the central axis 109 resulting in an overall horizontal motion in the cutting tool 106. This motion is repeated in two dimensions in conjunction with rotation of the workpiece 112 as discussed above with respect to FIG.

3 to successively cut teeth in the workpiece 112. The ratio of shift motion to feed motion can be varied to cut virtually any path along a workpiece 112 set by an angle 142 of the head 102 using the head rotator 116.

Figure 9:
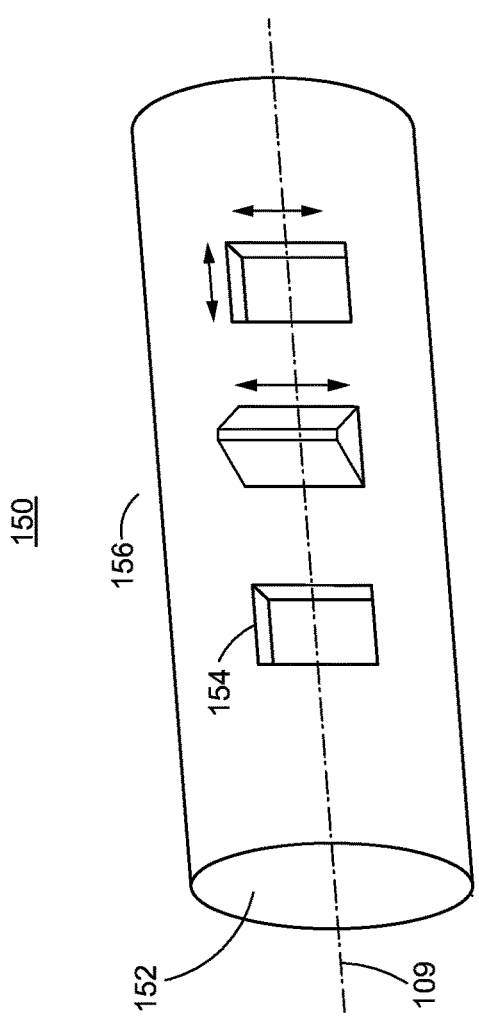
FIG. 9 is a perspective view illustrating an orientation of recesses in a zero lead cutting tool with replaceable teeth.
Figure 10:
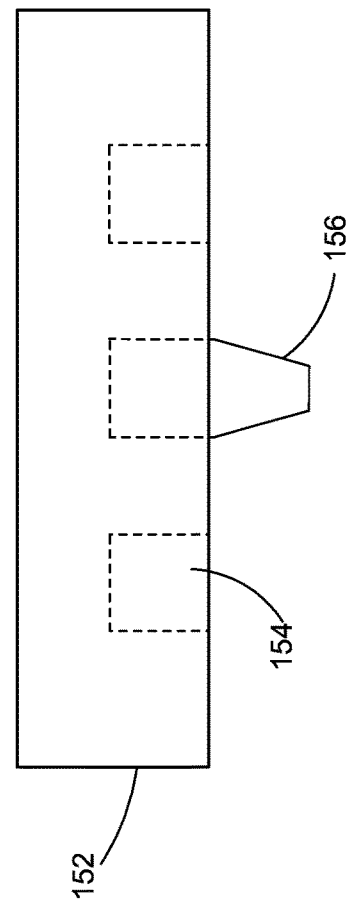
FIG. 10 is a top view illustrating an orientation of recesses in a zero lead cutting tool with replaceable teeth.

FIG. 9 and FIG. 10 are, respectively, a perspective view and a top view of a hob 150. The hob 150 has a hob base 152 having a recess 154 that is one of a plurality of similar recesses. The recess 154 is configured to receive a replaceable cutter 156. In a hob with helical teeth, a recess for receiving replacement cutters must be cut on an angle with respect to a centerline of the hob 150, that is, aligned with the pitch of the hob not with a cylinder of its hob base. This is an expensive and difficult process.

In a zero lead hob 150, illustrated in FIGS. 9 and 10, each recess 154 is radially and axially aligned with the hob base 152, making the machining operation much simpler than that for a helical hob.

A zero lead grinding wheel makes grinding wheel manufacture much simpler and allows for replaceable cutters 126 and more options for cutters. For example, an AlOx worm wheel may be supplanted by a zero lead AlOx cutting tool 106 with replaceable AlOx cutters 126, or a very expensive plated CBN worm wheel may be supplanted by a zero lead cutting tool 106 with much less expensive replaceable plated CBN cutters 126.

INDUSTRIAL APPLICABILITY

In general, the present disclosure can find industrial applicability in a number of different settings. For example, the present disclosure may be employed in manufacturing gears for use in different machines, such as but not limited to, engines, transmissions and actuators. Such machines may be employed in many different end products, such as, but not limited to those use in the earth-moving, construction, mining, agriculture, transportation, and marine industries.

FIG. 11 is a flow chart of one exemplary method 200 of machining a workpiece 112 using a gear cutting machine 100 with a cutting tool 106 having a zero lead between cutters 126 is depicted. At block 202, a cutting tool 106 is provided. The cutting tool 106 has cutters 126 with a zero lead angle, that is, each cutter 126 is perpendicular to a central axis 109 of the cutting tool 106. In an embodiment, the cutting tool 106 may have replaceable cutters 156.

At block 204, the cutting tool 106 may be oriented with respect to a workpiece 112. That is, for a straight gear a central axis 109 of the cutting tool 106 may be perpendicular to a central axis 114 of the workpiece 112. For a helical gear, the cutting tool 106 may be inclined with respect to the central axis 114 of the workpiece 112.

At block 206, the cutting tool 106 may be rotated around its central axis 109 and engaged with the workpiece 112 to cut gear teeth 124 in the workpiece 112. A rotation speed of the cutting tool 106 about its central axis 109 is independent of a speed of rotation of the workpiece 112.

At block 208, the cutting tool 106 may be shifted along the central axis 109 of the cutting tool 106 while engaging the workpiece 112. In conjunction, the workpiece 112 may be rotated around its own central axis 114 so that a shift speed of the cutting tool 106 matches a rotation rate of the workpiece 112. This is opposed to a prior art helical cutter where a rotation speed of the workpiece 112 is fixed to the speed at which the cutting tool 106 spins or rotates around the cutting tool central axis 109.

At block 210, the cutting tool 106 may be axially fed perpendicular to the central axis 109 of the cutting tool 106 while engaging the workpiece 112. This axial feed motion, as discussed above with respect to FIG. 3 may be repeated until the cutting tool 106 traverses a full height 130 of the workpiece 112 or less if specified by the requirements for the finished gear. The steps discussed in blocks 208 and 210 describing planar motion of the cutting tool 106 may be supplemented by moving the head 102 and therefore the cutting tool 106 in a z-axis 120 toward the central axis 114 of the workpiece 112 to produce a deeper cut. That is, for some gear teeth 124, the entire cut may not be accomplished in a single pass of the cutting tool 106.

At block 212, when a length (L) of the cutting tool 106 is less than a circumference (C) of the workpiece 112 an indexing operation may be used to complete the gear cutting process around the workpiece 112. When a contact point 140 between the cutting tool 106 and the workpiece 112 is at one end of the cutting tool 106, the cutting tool 106 may be indexed. The indexing process, described above in reference to FIGS. 5A and 5B, reestablishes the contact point 140 of the workpiece 112 with an opposite end of the cutting tool 106 so that machining can continue.

At block 214, when cutting a helical gear, the head 102 may be rotated so that a central axis 109 of the cutting tool 106 is inclined at an angle 142 away from a reference, perpendicular to a rotation axis of the workpiece 112.

The gear cutting machine 100 using a zero lead cutting tool 106 benefits gear manufacturers and their customers by creating a more flexible and less expensive process for manufacturing gears. Because a rotation speed of the workpiece 112 is independent of the speed of the cutting tool 106, cutting tool speed and motion may be independently adjusted to vary a quality of the cut from coarse to fine. The ability to index the cutting tool 106 not only allows gears of different diameters to be generated but also allows even wear across a length of the cutting tool 106 since each cutting tooth is equally exposed to the workpiece 112. In addition, manufacturing of the cutting tool 106 itself is simplified because the complex helical feature can be eliminated.

What is claimed is:

1. A gear cutting tool, comprising:
   a head that is programmably moveable in three axes;
   a rotary tool mounted to the head;
   a cutting tool with cutters having a zero lead angle, the cutting tool attached to the rotary tool so that as the rotary tool spins the cutting tool about a cutting tool central axis, the cutting tool and the rotary tool are moveable in three dimensions;
   a workpiece holder that holds a workpiece proximate to the cutting tool, the workpiece holder configured to rotate the workpiece about a workpiece axis in conjunction with at least one dimension of movement of the cutting tool;
   a head rotator that reorients the cutting tool central axis radially about an axis of rotation of the head rotator;
   a controller that coordinates independent motion of the head, the head rotator, and the workpiece holder according to a desired gear profile; and
   wherein a cutting motion sequence of the cutting tool with respect to the workpiece is repeated at one of a deeper cut or an offset to make a higher tolerance gear tooth.

2. The gear cutting tool of claim 1, wherein the controller moves the cutting tool perpendicular to a tooth line of the workpiece.

3. The gear cutting tool of claim 2, wherein when a contact point between the cutting tool and the workpiece is at one end of the cutting tool, the controller i) disengages the cutting tool from contact with the workpiece, ii) resets the cutting tool to establish the contact point using an opposite end of the cutting tool, and iii) restarts the motion of the cutting tool and the workpiece holder.

4. The gear cutting tool of claim 1, wherein a space of gear teeth in the workpiece is independent of a width of the cutters on the cutting tool.

5. The gear cutting tool of claim 1, wherein a rotation speed of the workpiece holder is independent of a rotation speed of the cutting tool.

6. The gear cutting tool of claim 1, wherein a cutting tool base has a recess for inserting a replaceable cutter, the recess perpendicular to the cutting tool central axis.

7. A method of cutting gears, comprising:
providing a cutting tool with cutters having a zero lead angle;
orienting the cutting tool with respect to a workpiece;
rotating the cutting tool about a central axis of the cutting tool;
engaging the cutting tool with the workpiece to cut gear teeth into the workpiece;
shifting the cutting tool along the central axis of the cutting tool;
rotating the workpiece while shifting the cutting tool along the central axis of the cutting tool;
feeding the cutting tool axially along an axis parallel to a central rotation axis of the workpiece and perpendicular to the central axis of the cutting tool while engaging the workpiece; and
when a contact point between the cutting tool and the workpiece reaches one end of the cutting tool, indexing the cutting tool to reestablish the contact point of the workpiece with an opposite end of the cutting tool.

8. The method of claim 7, further comprising:
rotating the central axis of the cutting tool with respect to the central rotation axis of the workpiece when cutting a helical gear.

9. The method of claim 7, further comprising:
repeating a motion of the cutting tool at a deeper cut to produce a higher tolerance gear tooth in the workpiece.

10. The method of claim 7, wherein providing the cutting tool with cutters having the zero lead angle comprises providing the cutting tool with replaceable cutters having the zero lead angle.

11. The method of claim 7, wherein a rotation speed of the cutting tool is independent of a speed of rotating the workpiece.

12. The method of claim 11, wherein the rotation speed of the cutting tool is increased to produce a higher tolerance finish in the workpiece and a speed of feeding the cutting tool axially along the axis parallel to a central rotation axis of the workpiece and perpendicular to the central axis of the cutting tool is decreased to produce a higher tolerance finish in the workpiece and a rate of shifting the cutting tool along the central axis of the cutting tool is decreased to produce a higher tolerance finish in the workpiece.

13. A gear cutting tool, comprising:
a head that is programmably moveable in three axes;
a rotary tool mounted to the head;
a cutting tool with cutters having a zero lead angle, the cutting tool attached to the rotary tool so that as the rotary tool spins the cutting tool about a cutting tool central axis, the cutting tool and the rotary tool are moveable in three dimensions;
a workpiece holder that holds a workpiece proximate to the cutting tool, the workpiece holder configured to rotate the workpiece about a workpiece axis in conjunction with at least one dimension of movement of the cutting tool;
a head rotator that reorients the cutting tool central axis radially about an axis of rotation of the head rotator;
a controller that coordinates independent motion of the head, the head rotator, and the workpiece holder according to a desired gear profile;
wherein the controller moves the cutting tool perpendicular to a tooth line of the workpiece; and
wherein when a contact point between the cutting tool and the workpiece is at one end of the cutting tool, the controller i) disengages the cutting tool from contact with the workpiece, ii) resets the cutting tool to establish the contact point using an opposite end of the cutting tool, and iii) restarts the motion of the cutting tool and the workpiece holder.

14. The gear cutting tool of claim 13, wherein a cutting motion sequence of the cutting tool with respect to the workpiece is repeated at one of a deeper cut or an offset to make a higher tolerance gear tooth.

15. The gear cutting tool of claim 13, wherein a space of gear teeth in the workpiece is independent of a width of the cutters on the cutting tool.

16. The gear cutting tool of claim 13, wherein a rotation speed of the workpiece holder is independent of a rotation speed of the cutting tool.

17. The gear cutting tool of claim 13, wherein a cutting tool base has a recess for inserting a replaceable cutter, the recess perpendicular to the cutting tool central axis.

* * * * *